(12) United States Patent
Mariller et al.

(10) Patent No.: US 9,057,599 B2
(45) Date of Patent: Jun. 16, 2015

(54) TOUCH PROBE

(71) Applicant: Tesa SA, Renens (CH)

(72) Inventors: Serge Mariller, Cheseaux-sur-Lausanne (CH); Benjamin Vullioud, Gollion (CH); Antonio M. Meleddu, Lausanne (CH)

(73) Assignee: TESA SA, Renens (CH)

(*) Notice: Subject to any disclaimer, the term of this patent is extended or adjusted under 35 U.S.C. 154(b) by 174 days.

(21) Appl. No.: 13/769,102

(22) Filed: Feb. 15, 2013

(65) Prior Publication Data
US 2013/0212891 A1 Aug. 22, 2013

(30) Foreign Application Priority Data

Feb. 20, 2012 (EP) .................................... 12156134
Dec. 21, 2012 (EP) .................................... 12199055

(51) Int. Cl.
*G01B 11/00* (2006.01)
*G01B 5/012* (2006.01)

(52) U.S. Cl.
CPC .............. *G01B 11/007* (2013.01); *G01B 5/012* (2013.01)

(58) Field of Classification Search
CPC .......... G01B 5/012; G01B 7/012; G01B 3/22; G01B 11/007; G01B 3/008; G01B 7/001; G01B 7/002; G01B 2210/58
USPC .................................... 33/559, 558, 561, 503
See application file for complete search history.

(56) References Cited

U.S. PATENT DOCUMENTS

| | | | |
|---|---|---|---|
| 4,270,275 A | 6/1981 | McMurtry | |
| 5,118,946 A | 6/1992 | Smith | |
| 5,404,649 A * | 4/1995 | Hajdukiewicz et al. | 33/503 |
| 5,435,072 A | 7/1995 | Lloyd et al. | |
| 6,760,977 B2 | 7/2004 | Jordil et al. | |
| 6,789,327 B2 * | 9/2004 | Roth et al. | 33/556 |
| 7,735,234 B2 * | 6/2010 | Briggs et al. | 33/561 |
| 7,891,109 B2 * | 2/2011 | Weston et al. | 33/561 |
| 8,127,458 B1 * | 3/2012 | Ferrari | 33/503 |
| 8,429,828 B2 * | 4/2013 | Ferrari | 33/503 |
| 8,661,700 B2 * | 3/2014 | Briggs et al. | 33/503 |
| 8,832,954 B2 * | 9/2014 | Atwell et al. | 33/503 |
| 2004/0118000 A1 * | 6/2004 | Roth et al. | 33/556 |
| 2004/0125382 A1 | 7/2004 | Banks | |
| 2006/0070253 A1 | 4/2006 | Ruijl et al. | |

(Continued)

FOREIGN PATENT DOCUMENTS

| | | |
|---|---|---|
| DE | 3713415 A1 | 11/1988 |
| EP | 360853 A1 | 4/1990 |

(Continued)

OTHER PUBLICATIONS

European Search Report dated May 8, 2014 as received in Application No. 12199055.0.

*Primary Examiner* — Yaritza Guadalupe-McCall
(74) *Attorney, Agent, or Firm* — Maschoff Brennan

(57) ABSTRACT

A touch probe comprising a fixed member; a feeler held by one or several elastic elements in a resting position relative to said fixed member, said feeler being capable of moving from said resting position in response to a deflection force; a detection system comprising a light source driven by the displacements of the feeler relative to said fixed member; an optical image sensor receiving the light emitted by said light source; an optical mask interposed on the light path between said light source and said optical image sensor.

18 Claims, 7 Drawing Sheets

(56) References Cited

U.S. PATENT DOCUMENTS

| | | |
|---|---|---|
| 2009/0165318 A1* | 7/2009 | Weston et al. .................. 33/561 |
| 2010/0325907 A1 | 12/2010 | Tait |
| 2011/0013199 A1 | 1/2011 | Siercks et al. |
| 2012/0210590 A1* | 8/2012 | Ferrari ............................ 33/503 |
| 2013/0212890 A1* | 8/2013 | Vullioud et al. ................. 33/503 |
| 2013/0212891 A1* | 8/2013 | Mariller et al. ................. 33/503 |
| 2014/0098378 A1* | 4/2014 | Ferrari .......................... 356/614 |

FOREIGN PATENT DOCUMENTS

| | | |
|---|---|---|
| EP | 415579 A1 | 8/1990 |
| EP | 764827 A1 | 9/1996 |
| EP | 1610087 A1 | 12/2005 |
| JP | 2005-315633 A | 11/2005 |
| JP | 2007-101491 A | 4/2007 |
| WO | 2012/007561 A2 | 1/2012 |
| WO | 2012007561 A2 | 1/2012 |

\* cited by examiner

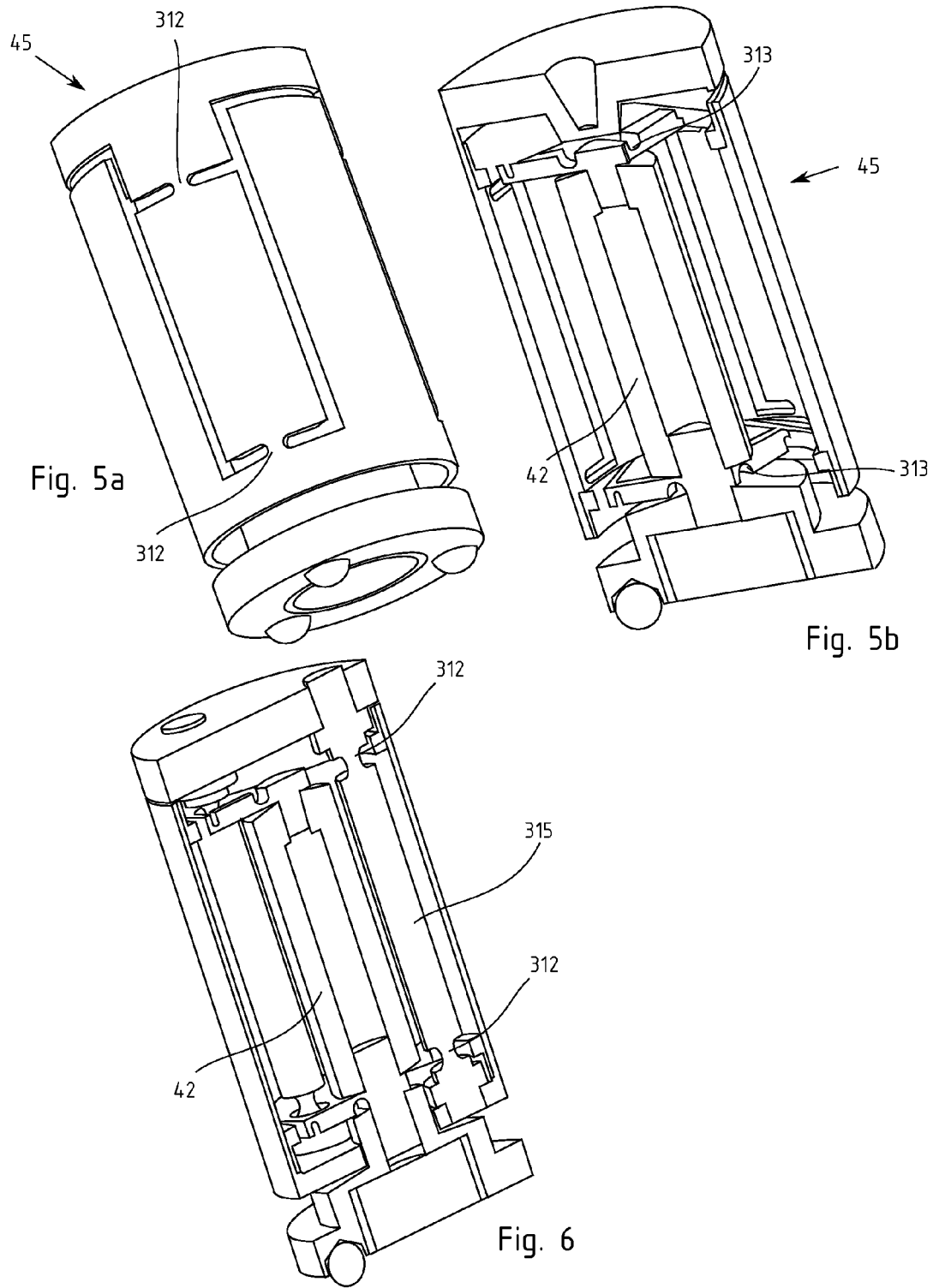

TOUCH PROBE

REFERENCE DATA

This application claims priority from European patent application EP12156134.4 filed Feb. 20, 2012, and from European patent application EP12199055.0 filed Dec. 21, 2012, in the name of the present applicant, which are hereby incorporated by reference in their entirety.

FIELD OF THE INVENTION

The present invention concerns touch probes or contact probes for coordinate measuring machines and notably, but not exclusively, trigger-type contact probes.

STATE OF THE ART

Touch probes and their use with measuring machines for measuring coordinates of the surface of a mechanical part are well known in the field of metrology. In a typical case, a contact probe comprises a mechanical interface for assembly onto the mobile platform of a measuring machine, and a stylus, with a ruby sphere at its extremity, designed to contact the surface to be measured. When the stylus touches the part and is moved from its resting position, the probe triggers an electric signal indicating that a contact has occurred. This signal is transmitted to a control unit that records the instantaneous coordinates of the machine and calculates the coordinates of the contact point on the part.

Analog probes, also called scanning probes, are also known which are capable of measuring the deflection of the stylus along one or several axes. These probes are used, as their name indicates, by scanning the surface of the part and measuring the coordinates along a trajectory.

In a known variant, for example as in EP0764827, U.S. Pat. No. 4,270,275 or U.S. Pat. No. 6,760,977, the stylus is fastened onto a support with three radial pins arranged symmetrically, each resting on two spheres integrally united with the probe's body. This arrangement constitutes an isostatic connection with six independent contact points; the relative position of the stylus in relation to the probe's body is thus accurately and repeatably defined. The trigger signal is generated when one of the pins lifts off the two spheres on which it normally rests, thus interrupting the electric contact between the two spheres. These probes of simple construction combine reliability and accuracy but suffer from several limitations. In particular, the sensitivity of the probe to a transverse force is not constant but varies according to the orientation of the external force, exhibiting three lobes corresponding to the directions of the three pins. This variation of the sensitivity is detrimental to the repeatability of the touch triggering and thus to the quality of the measuring. Altering the arrangement of the pins, as described for example in EP1610087 or DE3713415, can reduce this anisotropy, yet without however eliminating it completely.

European patent application EP0360853 attempts to remedy these problems by proposing a sensor in which the electric circuit is replaced by strain gauges that are directly sensitive to the force applied.

In other embodiments, for example the probes described in documents U.S. Pat. No. 5,435,072 and EP0415579, the contact between the stylus and the part to be measured is detected by a vibration sensor or by an optical sensor.

WO2012007561 describes a measuring device for determining the position of a light source relative to a fixed image detector and array.

BRIEF SUMMARY OF THE INVENTION

One aim of the present invention is to propose a touch probe free from the disadvantages of the known touch probes and that notably exhibits a constant sensitivity to lateral forces.

Another aim of the present invention is to propose a more touch probe that is more sensitive and accurate than the prior art probes.

These aims are achieved by a device having the characteristics of the attached claims.

BRIEF DESCRIPTION OF THE FIGURES

Examples of embodiments of the invention are indicated in the description illustrated by the attached figures, in which:

FIGS. 5a, 5b, and 6 illustrate elastic structures that can be used in the frame of the invention.

EXAMPLE(S) OF EMBODIMENTS OF THE INVENTION

Figure 1:
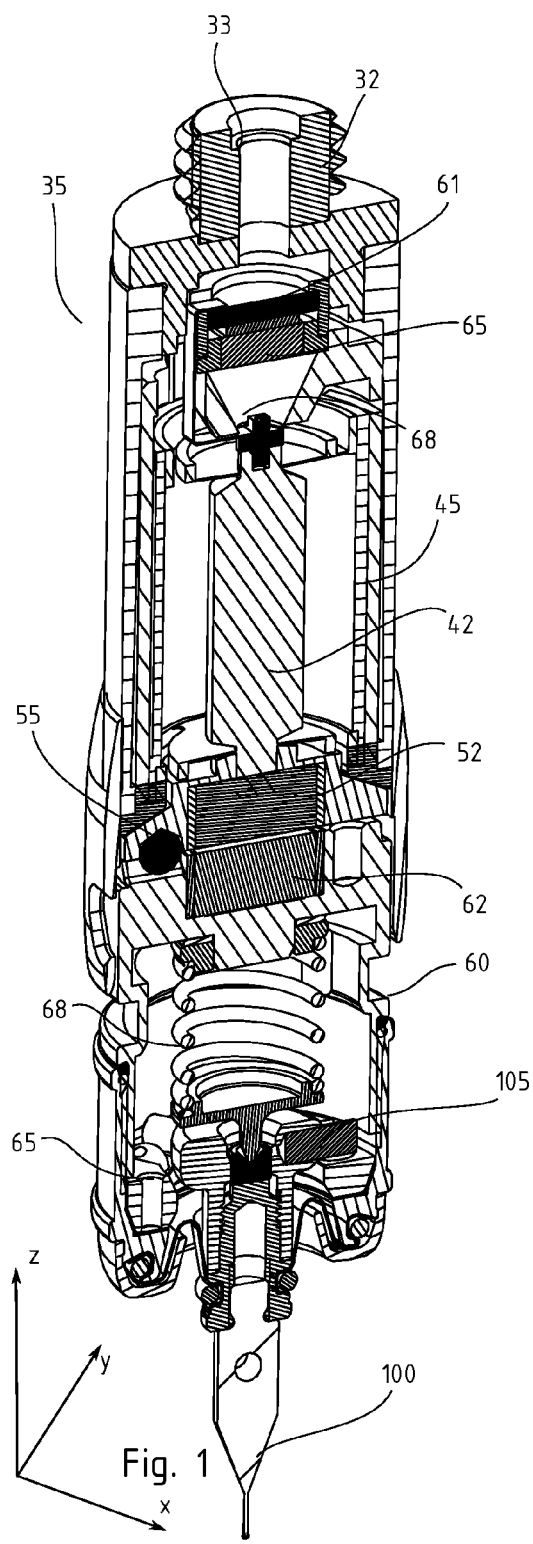
FIG. 1 illustrates a touch probe according to the invention, in cross section.

With reference to FIG. 1, the inventive touch probe comprises in one embodiment a feeler module 60 with a stylus 100 mounted onto a support 105 held elastically by the spring 66 in a resting position defined by the six contact points between three pints 65 (partly visible) of the support and six balls (not represented) integrally united with the feeler module. This arrangement enables the stylus to move under the action of an external force and to revert exactly to the resting position when this external force ceases to be exerted. As a certain gap (over-travel) is required to stop the movement of the measuring machine when the system detects a contact, this elastic assembly of the stylus makes it possible to limit the contact force during this time frame.

The manner in which the stylus 100 is mounted in the feeler module 60 is not an essential characteristic of the invention and other assembly layouts could be used, depending on need, without leaving the field of the invention.

The feeler module 60 is preferably connected in a removable fashion to the body of the probe 35 in order to be able to easily exchange the styluses depending on the measurement requirements. The feeler module 60 and the probe body can preferably be connected and separated automatically, in a manner compatible with the automatic tool changing systems currently used in measuring machines. In the example illustrated, the connection is achieved by means of the pair of magnets 52 and 62, placed one in the probe body and the other in the feeler module. In other embodiments, the connection could be achieved by a mechanical connector, for example the automatic connector described in document EP1577050 in the applicant's name. If modularity is not required, the feeler module and the probe body could be connected in a permanent manner.

The body of the probe 35 is provided with a connection device 32 to fasten it to the mobile platform of a measuring machine. In the example illustrated, the connection is achieved by a standard M8 screw 32, but other connection mechanisms are possible. The axial electric contact 33 enables the electronics inside the probe body to be powered by an external power source, as will be seen further below. If necessary, the single contact 33 could be replaced by a plurality of contacts.

The feeler module is integrally united, through the magnets 52, 62 or any other suitable connection means, with a support 55 which is held in position inside the body of the probe 35 by en elastic structure 45 so as to be able to follow, within predetermined limits, the deflections of the stylus along the axes x, y, z. The elastic structure, in the frame of the present invention, can have different shapes. The structure 45 will preferably have dimensions such that it exhibits the same elasticity in the three directions.

The rod 42 is integrally united on the lower side with the support 55 and bears on its upper side a light source 68, for example a light emitting diode (LED). The deflection movements of the stylus are thus converted in proportional displacements of the light source 68.

According to an important aspect of the invention, the probe body also comprises an image sensor, for example a CCD sensor 61 or any other suitable optical image sensor, juxtaposed to the light source 68 so as to receive the light emitted by the latter. A coded optical mask 65 is interposed on the light path between the source 68 and the image sensor 61. The optical mask 65 projects onto the sensor a non-uniform distribution of light intensity that moves according to the displacements of the LED source 68. A processing circuit, preferably integrated on the same silicon chip as the image sensor 61, determines the deflection of the stylus according to the three dimensions x, y, z relative to the probe body from the distribution of light intensity on the sensor's surface.

Figure 2:
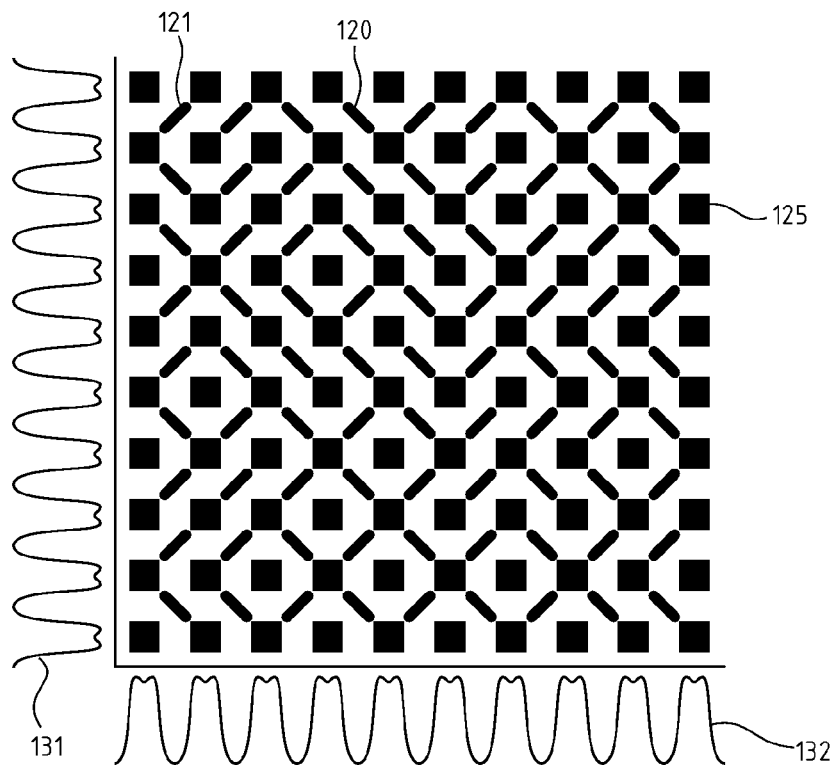
FIG. 2 illustrates schematically an optical mask that can be used in the frame of the invention.

The operating principles of the transducer constituted by the source 68, the mask 65 and the image sensor 61 have been described in documents EP1750099B1, EP2169357A1 and WO2010112082A1, and will not be analyzed here in detail. In the example represented in FIG. 2, the optical mask 65 carries a two-dimensional code comprising a regular array of tiles 125 and a code composed by an array of diagonal segments. In the example shown, for example, the segments parallel to the segment 121 encode a binary value '1' whilst the segments parallel to the segment 120 encode a binary value '0'.

Advantageously, the two-dimensional code represented by the segments enables an absolute positioning with the resolution of the array of tiles 125 whilst the interpolation of the signals 131 and 132 obtained by the projection along the axes of the light distribution makes it possible to determine accurately the relative position in x and y. Other arrangements are however possible.

In order to increase the reading and processing speed, the pixels are optionally grouped into zones, with each zone being dedicated to a specific measurement and constituting in effect an independent sensor. In the example illustrated in FIG. 3a, the pixels of the image sensor 61 are arranged in four quadrants 141, 142, 143, 144. The quadrants 141 and 143 arranged diagonally are arranged for determining the displacements in the x direction whilst the two other quadrants are designed for determining the displacements in the y direction. With reference to the example shown in FIG. 2, the processing circuit could be limited to calculating a single of the two projections 131 respectively 132 in each of the quadrants, along the direction of displacement one wishes to measure, thus limiting the number of operations. The code recorded in the optical mask 65 could also be divided into quadrants and consequently simplified. When the two projections X and Y are used for determining the position, the 2D sensor can be simplified to two 1D sensors each measuring the light intensity on a line in X or Y. An array of parallel optical fibers connected to a linear sensor (CCD) can fulfill this function.

According to an alternative embodiment, not illustrated, the optical mask is not present and a non-uniform light source is then used, i.e. a source that generates a non-uniform distribution of light intensity on the surface of the image sensor 61. For this purpose it would be possible to use an LED with a highly anisotropic emission profile, a laser diode, an optical system generating interference fringes or any other appropriate non-uniform source that enables the processing circuit to determine the deflection of the stylus along the three dimensions x, y, z from the distribution of the light intensity on the sensor's surface.

According to another variant, not illustrated, the optical mask does not comprise a plurality of transparent and opaque regions, as in FIG. 3, but an appropriate arrangement of transparent regions with different optical characteristics so as to generate a variable distribution of light intensity on the surface of the sensor. An array of lenses can advantageously be used in the optical mask to increase the intensity and the contrast of the light distribution on the sensor.

Figure 3A:
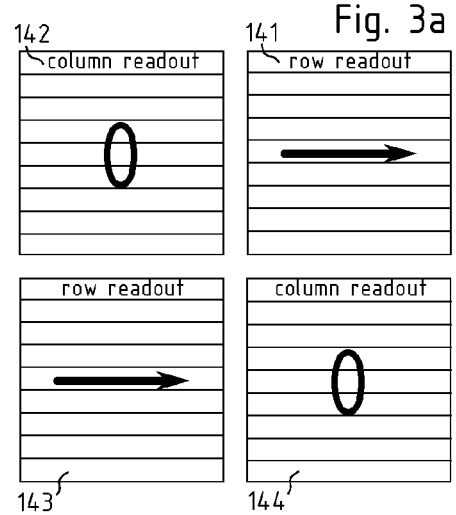
FIGS. 3a to 3c show an image sensor divided into four quadrants.
Figure 3B:
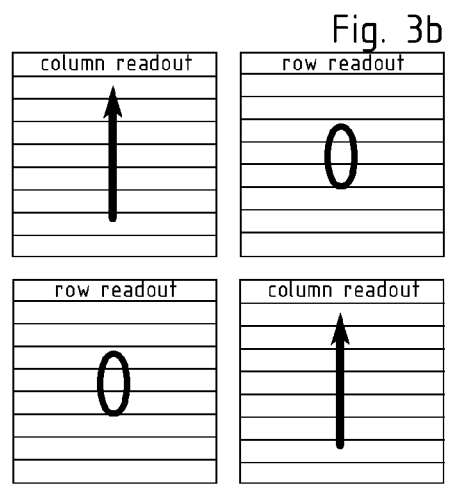

FIG. 3a illustrates the situation in which there is a displacement of the source 68 along the x-axis. The quadrants 141 and 143 record a same displacement whilst the two other quadrants record no variation. Inversely, when the displacement is only in the direction of the y-axis, the two quadrants 142 and 144 record an identical displacement and nothing is measured by the quadrants 141 and 143, as can be seen in FIG. 3b.

Figure 3C:
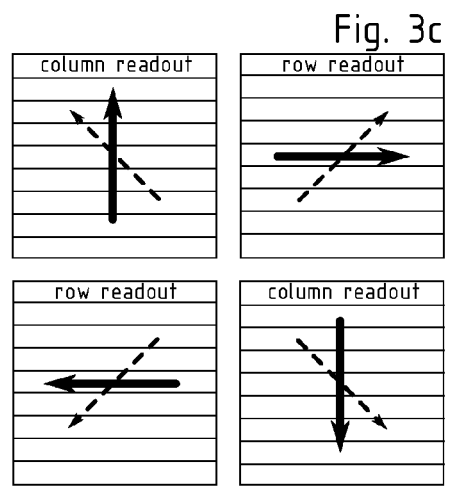

FIG. 3c illustrates the situation that arises during a displacement along the z-axis. In this case, it is the scale of the image projected by the mask 65 that changes. The quadrants 141 and 143, and even the quadrants 142 and 144, measure opposite displacements. In a general case, the relative movement of the source 68 can be decomposed in a superposition of movements in x, y, and z.

This variant embodiment of the invention comprises four image sensors, each being adapted for measuring a coordinate of the position of the light distribution projected by the mask.

In the example described, the image of the mask projected onto said optical image sensor changes depending on the movements of the feeler 100 since the light source 68 is driven by the displacements of the feeler relative to said fixed member. It would also be conceivable, while remaining in the frame of the invention, to drive by the feeler the mask or the image sensor, with the same effect. The invention also includes variant embodiments in which the source, the mask and the sensor remain fixed relative to the probe body but the optical trajectory comprises another mobile optical element capable of modifying the image on the sensor depending on the displacements of the feeler 100, for example a mirror, a lens, a prism or any other optical element or combination of optical elements driven by the feeler 100.

The displacements of the light source 68 are proportional to those of the contact stylus 100. The processing circuit can thus trigger a contact signal when the displacement of the feeler exceeds a determined threshold. Advantageously, this trigger threshold can be modified dynamically according to the measurement conditions, by appropriately reprogramming the processing circuit. It would for example be possible to increase the value of the threshold when the measuring machine moves rapidly in order to avoid false signals determined by the vibrations or corresponding to accelerations and decelerations of the probe, and to reduce the value of the threshold when the machine moves slowly to aim for maximum accuracy. The trigger threshold could also be modulated depending on the stylus used, by selecting a greater threshold when longer and heavier styluses, more sensitive to vibrations, are mounted.

According to one aspect of the invention, the processing circuit can also perform a validation of the trigger signal and distinguish the signals derived from a true contact of the feeler 100 with the part to be measured from false signals due, for example, to vibrations. The discrimination can be achieved based on the duration of the deflection signal or on its time profile, for example.

The probe can also be used in scanning mode, in which the processing circuit indicates the deflection of the stylus along one or several axes, measured by the optical sensor.

According to a variant embodiment, not illustrated, the optical sensor could have a non-plane surface, for example in the shape of a roof or pyramid, to increase the collecting of light and sensitivity to axial displacements.

Figure 4:
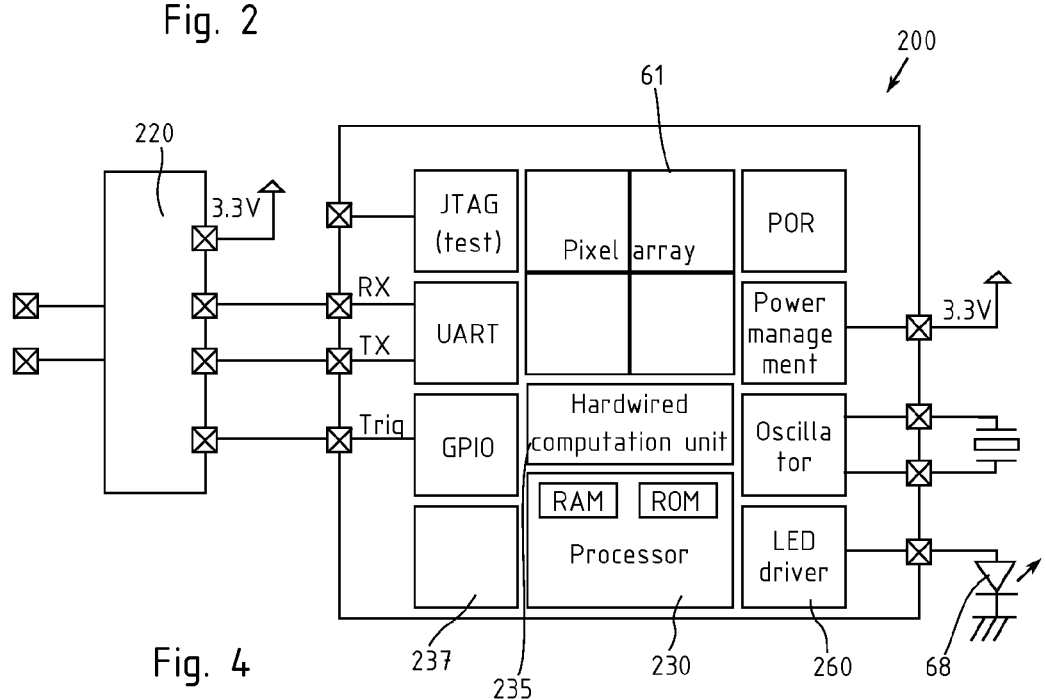
FIG. 4 shows schematically a processing circuit that can be used in the frame of the invention.

FIG. 4 illustrates schematically a possible structure of a processing circuit 200 according to one aspect of the invention. The optical sensor 61 is advantageously integrated in the same integrated circuit of the processing circuit. The circuit 200 in this example comprises a microprocessor 230 and a wired logic unit 235 to perform processing operations on the pixels of the sensor 61, for example projections, averages and/or correlations. The unit 237 is an arithmetic module dedicated to calculating mathematical or trigonometric functions, for example a module using the CORDIC (COordinate Rotation DIgital Computer) techniques.

The circuit 200 preferably also includes environmental sensors, for example an accelerometer and/or a temperature sensor. The accelerometer is used for example to determine the dynamic threshold of the trigger signal or whether the probe has suffered a shock. The signal supplied by the temperature sensor is used in the circuit 200 to compensate temperature errors.

According to a variant embodiment of the invention, the probe could include a plurality of image sensors 61, with a single common processing circuit, or each provided with its own processing circuit, or with several processing circuits, each arranged for processing the images recorded by a group of several image sensors.

The processor 230 is preferably programmed or designed to determine the position of the light source 68 and consequently the position of the feeler 100 from the spatial distribution of light intensity on the optical image sensor 61 or on the optical image sensors 61, and to generate a position signal, or several position signals representing the position and/or the deflection of the feeler 100.

The processing circuit also has an input/output unit 220, designed for transmitting the position signals to the measuring machine, according to a determined format. When the touch probe is used as a trigger probe, the position signal can be a binary signal with two possible values, one to indicate an essentially zero deflection and the other to indicate a deflection corresponding to a predetermined trigger force being exceeded.

The trigger signal can advantageously be transmitted in the form of a variation of the electric current absorbed by the probe. This allows the inventive touch probe to be used as a replacement for classical trigger touch probes. The deflection values of the feeler is preferably available in three coordinates to the processing circuit 230, so the latter can thus calculate the contact force acting on the feeler for any direction of action. The inventive probe can thus supply a deflection signal depending isotropically on the force acting on the feeler. Another advantage of the present invention, when it is applied to a trigger probe, is that the trigger threshold can be easily reprogrammed.

This latter variant of the invention can be used for trigger measurements, in which the measuring machine is programmed for bringing the feeler 100 into punctual contact with the surface of the part to be measured and the touch probe transmits to the machine a trigger signal at the instant of contact, enabling the coordinates of the contact point to be calculated, using an appropriate software.

According to a variant embodiment of the invention, the processor 230 is programmed or designed to generate a signal representing with continuity the position and/or the deflection of the feeler 100 in one, two or preferably three measuring axes X, Y and Z. The touch probe can then encode the position and/or the deflection of the feeler 100 in a predetermined digital format and send it through the unit 220 to the measuring machine.

This latter variant embodiment of the invention can be used for scanning measurements, in which the measuring machine causes the feeler 100 to travel a trajectory in contact with the surface of the part to be measured, and the touch probe transmits to the machine deflection values that enable the coordinates of the contact points along the trajectory to be calculated, using an appropriate software.

In order to ensure compatibility with existing measuring systems, it is possible to use one or several digital-analog format converters (DAC) to generate analog signals representing the position and/or the deflection of the feeler 100 along determined measuring axes. These converters could be integrated into the probe or in an external unit.

According to another aspect of the invention, the input/output unit 220 allows a bi-directional communication with an external unit, for example the controller of the measuring machine or a computer measuring system. The probe can then send through the unit 220 trigger signals and/or deflection measurements and/or validation signals, in an appropriate format. The probe can also receive, through the unit 220, calibration data or trigger threshold values or any other signal.

FIGS. 5a, 5b illustrate schematically flexible structures 45 that can be used in the frame of the invention. These structures have 3 columns (315), 3 plates or other rigid vertical elements with, at each of the 2 extremities, one element (312) having a much greater lateral flexibility. Radial arms with collars (313) ensure the axial deflection of these structures. The vertical elements can be mono-bloc or separate. FIG. 6 illustrates a variant embodiment in which the lateral flexibility is provided by the columns 315. Other arrangements are however possible.

A preferred embodiment of the inventive touch probe will now be described with reference to FIGS. 7, 8, 9a, 9b and 10. According to this variant, the probe comprises an elastic structure as previously mentioned, consisting of an integral metallic part 400 connecting the support 55 at its lower extremity and the light source 68 at the opposite extremity.

Figure 9A:
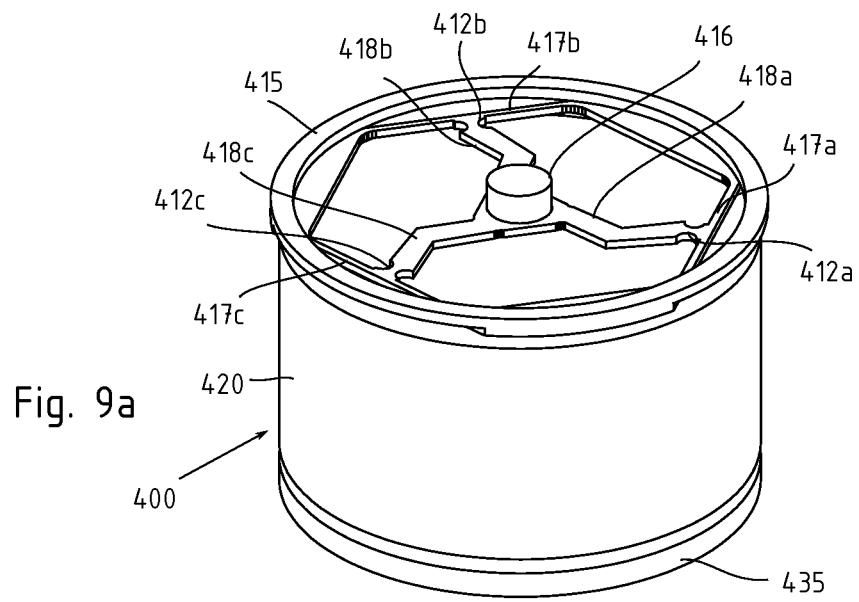
FIGS. 9a and 9b illustrate two possible embodiments of the elastic structure used in the embodiment of FIGS. 7 and 8.
Figure 9B:
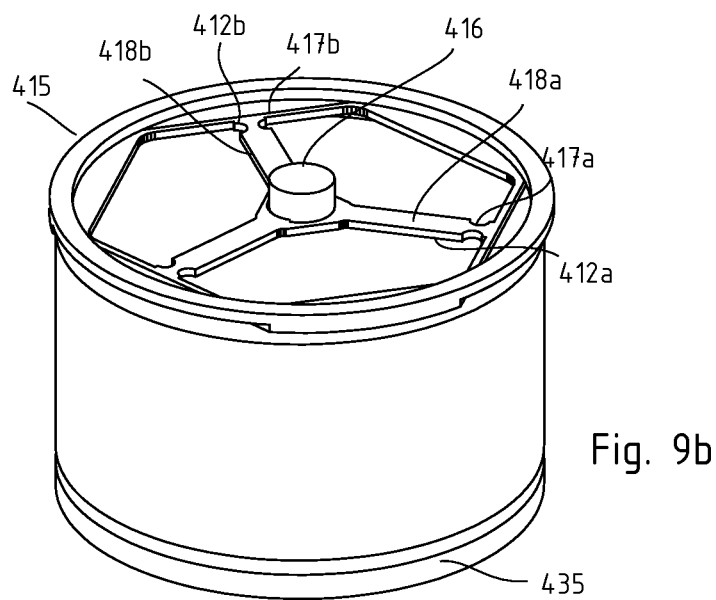

The elastic structure 400 is more clearly visible in FIGS. 9a, 9b and 10, with the FIGS. 9a and 9b representing two possible variant embodiments of the upper flexible part, as will be seen further below. It has an essentially cylindrical shape and is made of a single integral metallic part without assemblies or welding seams. The elastic structure 400 is preferably achieved by machining, i.e. by turning and milling of a cylinder of appropriate material, for example of tempered steel. It would however also be possible to use in the frame of the invention other manufacturing techniques, for example electro-erosion, laser cutting or any other appropriate method for removing material. It would also be possible to make the elastic structure 400 by molding or by additive manufacturing processes, for example by selective laser sintering, stereolithography, 3D impression etc.

Figure 10:
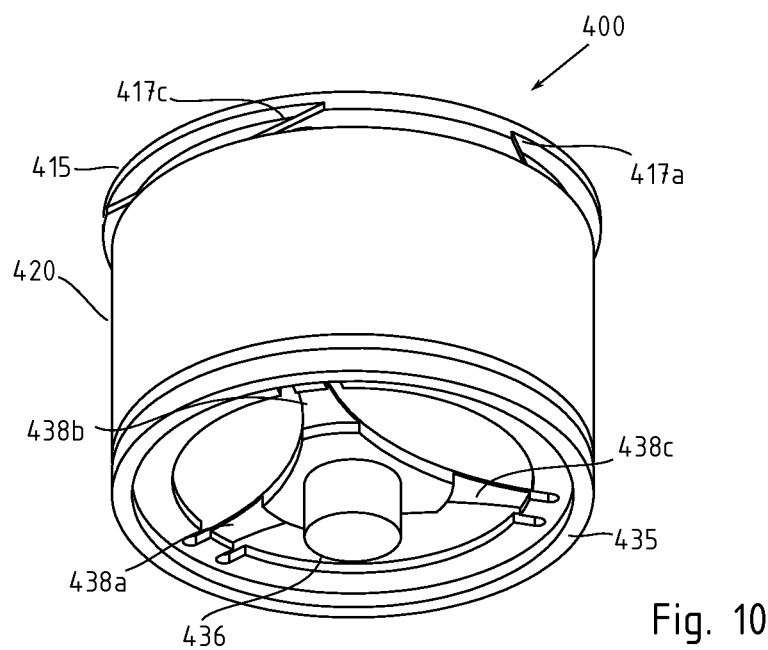
FIG. 10 shows another view of the elastic structure represented in FIGS. 9a and 9b.
Figure 11:
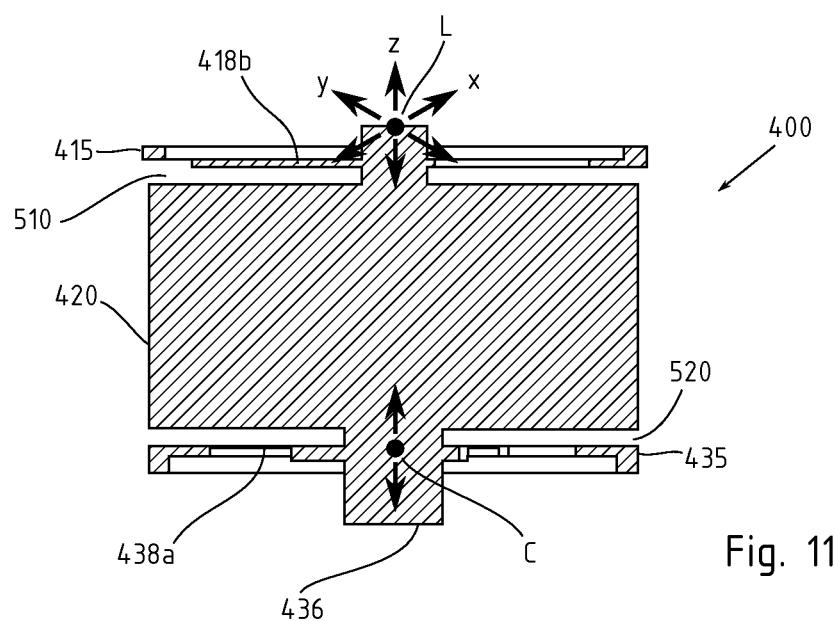
FIG. 11 is a cross-section of the elastic element of FIG. 9b, wherein the degrees of freedom have been represented.
Figure 12:
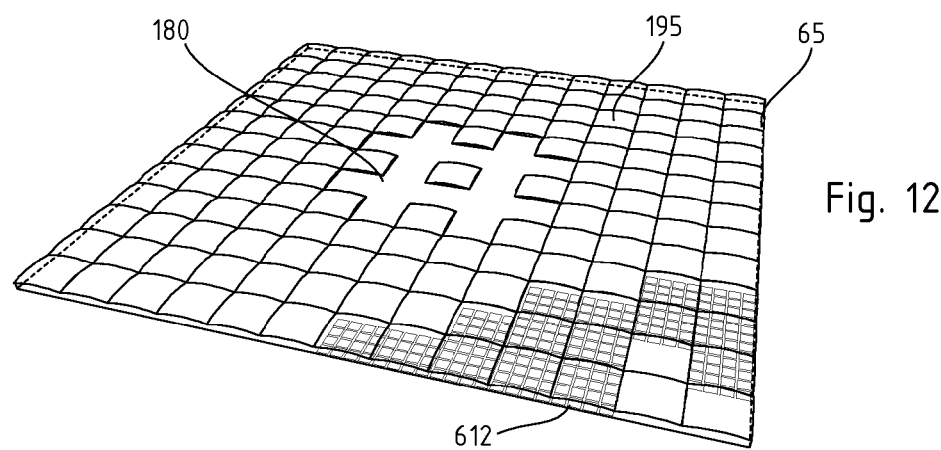
FIG. 12 illustrates a variant embodiment of the optic image sensor of the invention surmounted by an optical mask comprising an array of micro-lenses.

According to one aspect of the invention, the elastic structure 400 comprises an essentially cylindrical central body 420 and two upper and lower end parts, separated from the cylindrical body by two grooves 510 and 520 visible in FIGS. 10 and 11. The lower end part comprises a central projection 436 on which the support of the feeler module 55 is fastened, for example through chasing. The upper end part also has a central projection 416 on which the light source 68 is mounted, for example by gluing. The light source is preferably connected to the processing circuit by flexible conductors or a flexible printed circuit.

The two end parts also each comprise a peripheral ring 435 respectively 415 integrally united with the probe body, whilst the lateral surface of the cylindrical body 420 is not in contact with other components and can move under the effect of forces acting on the feeler 100.

FIGS. 9a, 9b illustrate two possible variant embodiments of the upper end part of the elastic element 400. The two variants comprise three tangential girders 417a, 417b, 417c fastened by their extremities to the peripheral ring 415 and three radial arms 418a, 418b, 418c connected on the one hand to the middle point of the corresponding tangential beam and on the other hand to the center of the end part. Notches 412a, 412b, 412c form elastic hinges and improve the flexibility properties of the whole assembly, notably in the axial and lateral directions. The two variant embodiments differ essentially in the shape of the arms 418a-c that are straight in the second version and have a more or less accentuated angle in the first in order to increase its flexibility.

The upper end part of the elastic element 400 can advantageously be achieved with conventional machining operations: it is for example possible to mill the arms 418a-c through the upper side and detach the tangential girders 417a-c from the ring 415 with three milled straight grooves 417a-c (better visible in FIG. 10). The end part is separated from the cylindrical body 420 by the groove 510 (FIG. 11).

FIG. 10 illustrates a possible structure for the lower end part of the elastic element 400. The peripheral ring 435 is connected to the central part 436 by three arms 438a-c that have a thin central sail in order to increase the flexibility of the whole assembly especially in the axial direction. By comparison with the upper end part, the lower end part is adapted so as to deform under an axial force and is relatively rigid in the directions orthogonal to the axis. Just as the upper part, the other end part of the elastic element 400 can be made in conventional machining operations.

FIG. 11 shows the flexible element in cross-section and the movements rendered possible by the flexibility of the end parts. As already mentioned, the peripheral rings 435 and 415 are fastened to the probe body, whilst the lower projection 436 is connected to the feeler by the support 55 and the upper projection 416 bears the light source. The forces exerted on the stylus 100 induce different deformations in the end parts according to their respective mechanical characteristics.

The lower end part is designed so as to exhibit a considerable flexibility relative to the axial forces and is by contrast relatively rigid relative to the forces acting transversely to the axis since the sails of the arms 438a-c can easily flex but the length of the arms 438a-c remains essentially unchanged. Consequently, the point 'C' situated at the intersection of the arms 438a-c moves along the axis 'z' in FIG. 11 but remains essentially on the axis of the elastic element 400.

Simultaneously, the independent flexibility of the arms 438a-c allows, if the stylus 100 is subjected to a lateral force, a rotation of the element 420 around the point (C) in the two transverse directions 'x' and 'y'. It is thus possible to model the constraints introduced by the lower end part as a slide enabling the axial displacement of the center 'C' combined with a ball joint of the center 'C'.

Thanks to the arrangement of radial arms connected to tangential beams, the upper end part enables the displacement of the light source at the point 'L' along the three axes 'x', 'y', 'z'. The flexibility of said arms and beams determines the return forces or quantitative flexibility values along the three axes. In a typical case, the inventive touch probe could exhibit a flexion of several tens of nm in X, Y and Z following a force of several grams acting on the stylus in the axes X, Y and Z. These flexibility values ensure a good sensitivity and quite high self-vibration frequencies beyond the typical vibration frequencies of a coordinate-measuring machine (CMM).

The symmetric arrangement of the arms 418a-c and 438a-c makes it possible to achieve a highly isotropic flexibility that is essentially independent of the lateral direction of the force. The invention is however not limited to devices with three arms and could have two, four and more arms, depending on circumstances.

Figure 7:
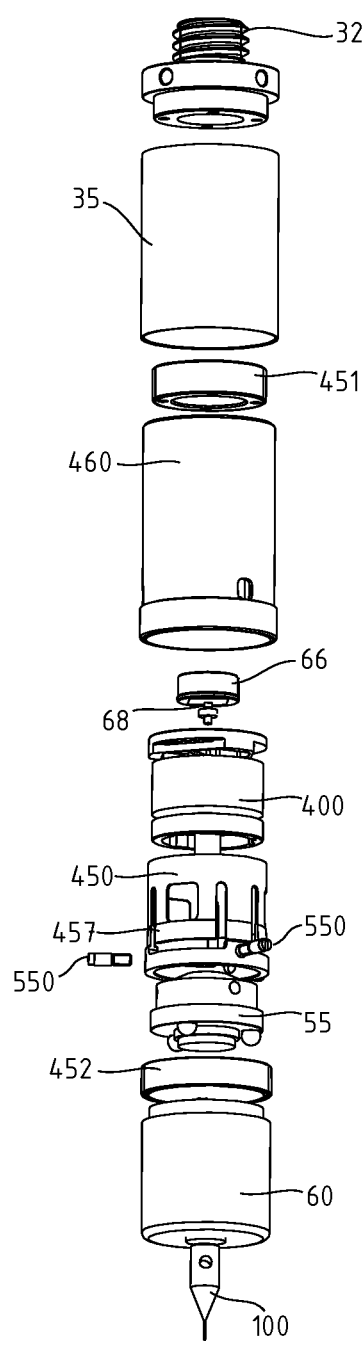
FIGS. 7 and 8 show a variant embodiment of the invention in an exploded view and in a cross-sectional view.
Figure 8:
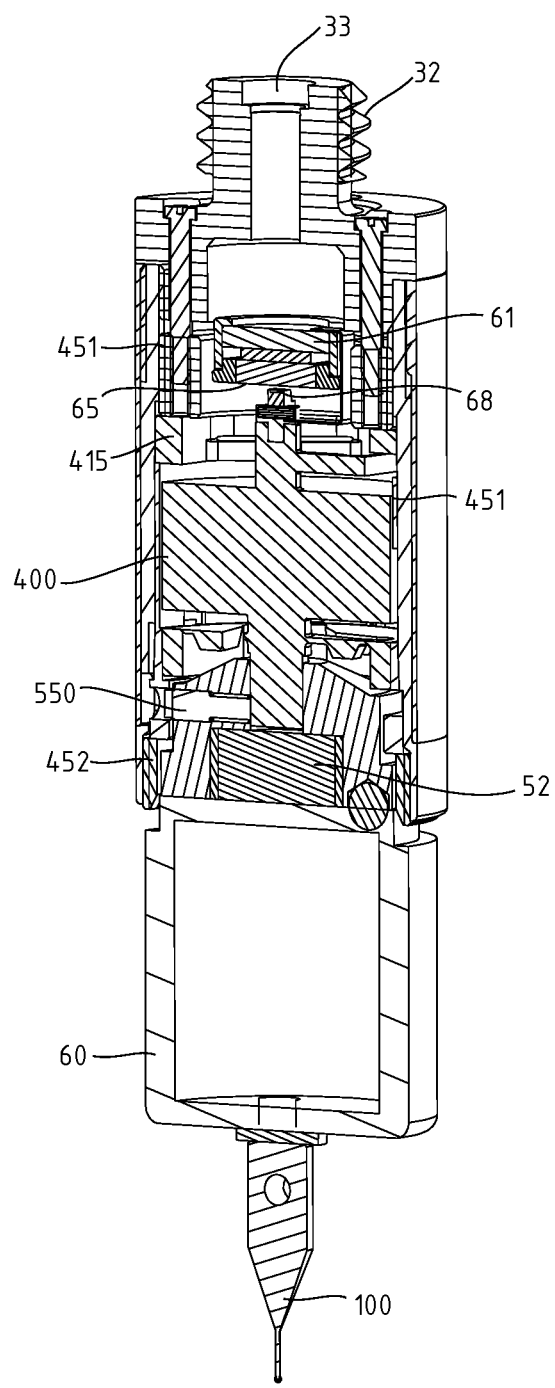

The assembly of the elastic structure 400 in the probe will now be described with reference to FIGS. 7 and 8. According to a preferred embodiment of the invention, the elastic structure 400 is lodged inside a ferrule 450 with flexible branches 757. When the ferrule 450 is inserted inside the tube 460, the branches 757 pinch the lower peripheral ring 435 and center it into place. Axially, the lower side of the ferrule 450 rests on the threaded ring 452 and its upper side supports the upper peripheral ring 415 on which a second threaded ring 451 is screwed. In this manner, it is possible to achieve a fastening and accurate centering of the elastic structure 400 in the axis of the probe, by means of the two upper and lower peripheral rings.

The movements of the stylus and the deformations of the elastic part 400 are limited by the three screws 550 at 120° that engage in appropriate housings in the support of the feeler module 55. Other limiting means are however possible.

FIG. 11 illustrates a variant embodiment of the optical image sensor of the invention in which the optical mask is composed of an array of mini-lenses 195 that project a two-dimensional distribution of the light coming from the mobile source onto the photo-sensors 612, wherein each of which corresponds to a pixel of the recorded image (only part of the photo-sensors is represented in order to simplify the drawing). By comparison with the variant embodiment illustrated previously, the micro-lenses enable a greater optical efficiency and thus a more favorable signal-to-noise ratio on the pixels.

The image projected by the mini-lenses comprises a two-dimensional distribution of more or less bright zones, depending on whether the point under consideration is located substantially in the axis of a lens or between two adjacent lenses. The processor can analyze this light distribution and determine accurately the position of the light source. The symmetry of the array allows a very accurate determining of the position by interpolation of the light distribution.

If the entire surface of the mask 65 were occupied by a perfectly regular array symmetrical in XY, the light distribution would also be symmetrical and it would only be possible to obtain an incremental determination of the position in XY, with an ambiguity equal to the spacing of the array. The array 61 preferably comprises a zone 290 with transmission characteristics that are specific and different from the rest in order to move away from perfect symmetry, thus enabling the position in XY to be determined absolutely. In the example illustrated, the zone 290 is a central zone without lenses at the center of the array, but it is also conceivable to have a special zone 195 of different shape, positioned at the edge of the array or any arrangement that alters the array's symmetry.

Figure 13A:
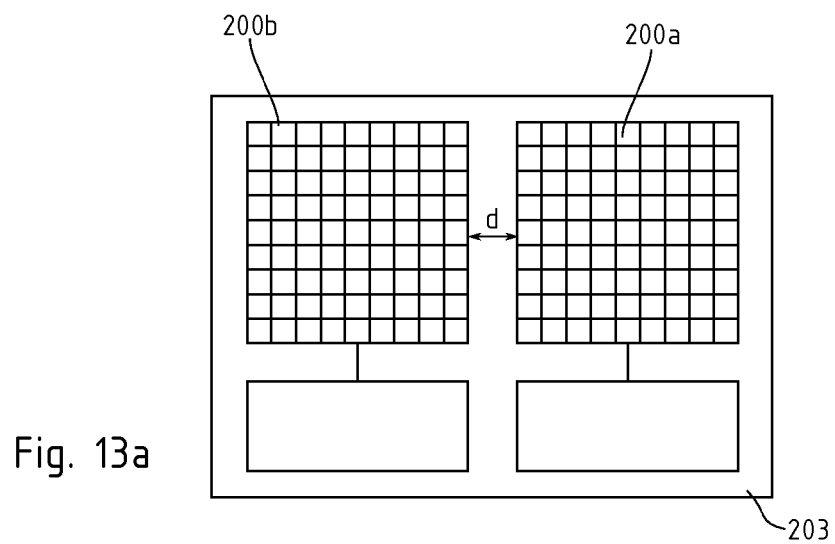
FIGS. 13a and 13b illustrate two variant embodiments of the invention with a pair of sensors placed side by side.

FIG. 13a illustrates an arrangement comprising two image sensors which each enable the position to be determined in two dimensions and supply a way of obtaining a measurement of the position of the light source in three coordinates in space. The image sensors are placed one next to the other and separated by a distance 'd' parallel for example to the axis 'X'. The sensors 200a and 200b are preferably made on a common silicon wafer 203, so that the distance 'd' is determined exactly.

During the displacements of the light source 65 (not visible) along the three axes, the image sensors give values of 'X' and 'Y' according to the following table:

TABLE 1

| Displacement of source | 200a | | 200b | |
|---|---|---|---|---|
| | X | Y | X | Y |
| X increasing | increasing | constant | increasing | constant |
| X decreasing | decreasing | constant | decreasing | constant |
| Y increasing | constant | increasing | constant | increasing |
| Y decreasing | constant | decreasing | constant | decreasing |
| Z increasing | increasing | constant | decreasing | constant |
| Z decreasing | decreasing | constant | increasing | constant |

It can thus be seen that the movements in three dimensions of the source can be determined by analyzing the positions in two dimensions supplied by the two sensors 200a and 200b shifted by a distance 'd'. It would for example be possible to approximate the coordinates 'X' and 'Y' by the average of the results obtained by the sensors 200a and 200b and calculate the coordinate 'Z' by the difference between the coordinates 'X' supplied by 200a and 200b.

Figure 13B:
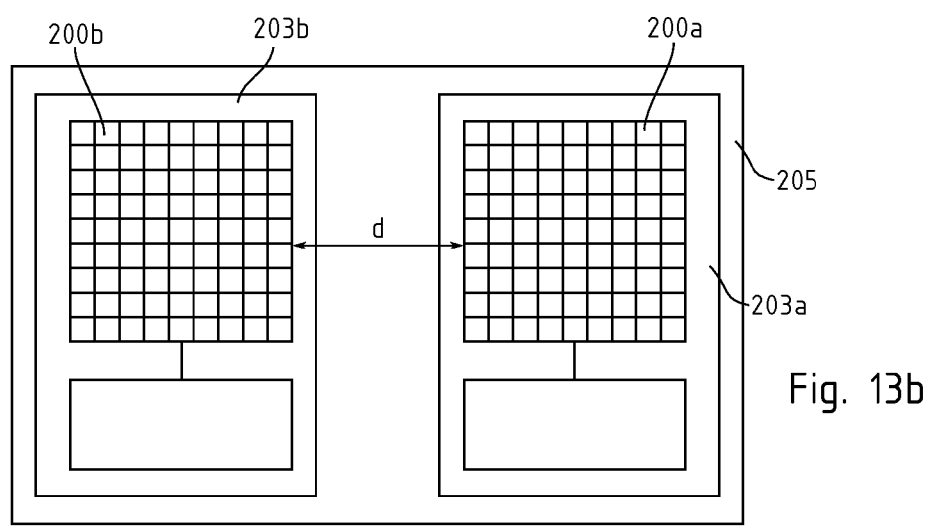

In the example of FIG. 13b, the two sensors 200a and 200b are placed at a distance 'd' greater than that of FIG. 13a. Consequently, the rays coming from the mobile light source fall onto the sensors at a higher angle and the sensitivity to the movements in 'Z' is greater than in the example of FIG. 13a. In this variant embodiment, the sensors are each on an individual silicon wafer 203a, 203b, and the two wafers are fastened onto a common substrate 205.

The invention claimed is:

1. A touch probe comprising:
   a fixed member;
   a feeler held by one or several elastic elements in a resting position relative to said fixed member, said feeler being capable of moving from said resting position in response to a deflection force;
   a system for detecting displacements of the feeler comprising a light source;
   an optical image sensor receiving the light emitted by said light source, wherein a spatial distribution of intensity on said optical image sensor changes according to the displacements of said feeler; and
   an optical mask interposed on the light path between said light source and said optical image sensor.

2. The touch probe of claim 1, further comprising a processing circuit arranged for determining the position and/or the deflection of the feeler along one, two or three measuring axes from the image recorded by the optical image sensor and for transmitting a position signal representing said position and/or deflection to a measuring machine.

3. The touch probe of claim 2, wherein the processing circuit is designed to trigger a contact signal when the force acting on the feeler exceeds a determined threshold.

4. The touch probe of claim 2, wherein the processing circuit is designed to generate a deflection signal representing continuously the position and/or deflection of the feeler along one, two or three measuring axes.

5. The touch probe of claim 1, further comprising a temperature sensor, wherein the processing circuit is designed to compensate the temperature errors from the signal supplied by the temperature sensor.

6. The touch probe of claim 1, further comprising an accelerometer.

7. The touch probe of claim 1, further comprising a plurality of optical image sensors receiving the light emitted by said light source, wherein a spatial distribution of intensity on said optical image sensors changes according to the displacements of said feeler, with the probe further comprising a processing circuit designed to determine the displacements of the feeler in three dimensions from the light distribution recorded by the optical image sensors.

8. The touch probe of claim 1, wherein said one or several elastic elements consist of a mono-bloc metallic part.

9. The touch probe of claim 8, wherein said mono-bloc metallic part has an essentially cylindrical shape with two end elements corresponding to the two bases, said feeler being integrally united with the center of an end element, and said light source being integrally united with the center of the opposite end element, where each end element exhibits a peripheral ring integrally united with the probe body and a plurality of deformable elements allowing the displacement of the light source along three axes.

10. The touch probe of claim 1, wherein said mask comprises a lens array.

11. The touch probe of claim 1, wherein said light source is driven by the displacements of the feeler relative to said fixed member.

12. The touch probe of claim 1, wherein the feeler is connected in a removable fashion to the detection system by means of a magnetic or mechanical connection.

13. The touch probe of claim 12, wherein the feeler is borne by a changeable module comprising a feeler support held elastically in a resting position by a plurality of positioning elements defining six contact points.

14. The touch probe of claim 1, wherein said elastic elements comprise rigid elements extending along an essentially axial direction with flexible elements at the ends ensuring lateral flexibility, and arms with collars ensuring axial flexibility.

15. A touch probe comprising:
   a fixed member;
   a feeler held by one or several elastic elements in a resting position relative to said fixed member, said feeler being capable of moving from said resting position in response to a deflection force;

a system for detecting displacements of the feeler comprising a light source; and an optical image sensor receiving the light emitted by said light source, wherein a spatial distribution of intensity on said optical image sensor changes according to the displacements of said feeler, wherein said light source is driven by the displacements of the feeler relative to said fixed member.

16. A touch probe comprising:

a fixed member;

a feeler held by one or several elastic elements in a resting position relative to said fixed member, said feeler being capable of moving from said resting position in response to a deflection force;

a system for detecting displacements of the feeler comprising a light source;

a plurality of optical image sensor receiving the light emitted by said light source, wherein a spatial distribution of intensity on said optical image sensor changes according to the displacements of said feeler; and a processing circuit designed to determine the displacements of the feeler in three dimensions from the light distribution recorded by the optical image sensors.

17. A touch probe comprising:

a fixed member;

a feeler held by one or several elastic elements in a resting position relative to said fixed member, said feeler being capable of moving from said resting position in response to a deflection force;

a system for detecting displacements of the feeler comprising a light source;

an optical image sensor receiving the light emitted by said light source, wherein a spatial distribution of intensity on said optical image sensor changes according to the displacements of said feeler; and an optical mask having a plurality of transparent and a plurality of opaque regions, the optical mask interposed on the light path between said light source and said optical image sensor.

18. A touch probe comprising:

a fixed member;

a feeler held by one or several elastic elements in a resting position relative to said fixed member, said feeler being capable of moving from said resting position in response to a deflection force;

a system for detecting displacements of the feeler comprising a light source;

an optical image sensor receiving the light emitted by said light source, wherein a spatial distribution of intensity on said optical image sensor changes according to the displacements of said feeler; and an optical mask comprising a lens array lying essentially in a plane, the optical mask interposed on the light path between said light source and said optical image sensor.

* * * * *